United States Patent [19]

Thompson

[11] Patent Number: 5,493,624
[45] Date of Patent: Feb. 20, 1996

[54] POLARISATION STATE CONVERTER

[75] Inventor: George H. B. Thompson, Sawbridgeworth, United Kingdom

[73] Assignee: Northern Telecom Limited, Montreal, Canada

[21] Appl. No.: 344,551

[22] Filed: Nov. 23, 1994

[30] Foreign Application Priority Data

Nov. 25, 1993 [GB] United Kingdom ............... 9324221
Aug. 4, 1994 [GB] United Kingdom ............... 9415808

[51] Int. Cl.⁶ ................................. G02B 6/00
[52] U.S. Cl. .................... 385/11; 385/14; 385/15; 385/27; 385/28; 359/483; 359/494; 359/497
[58] Field of Search .................... 385/11, 14, 15, 385/16, 27, 28, 29, 129, 130, 131; 359/483, 494, 495, 497, 501

[56] References Cited

U.S. PATENT DOCUMENTS

| | | | |
|---|---|---|---|
| 4,153,328 | 5/1979 | Wang | 385/14 X |
| 4,381,137 | 4/1983 | Berg et al. | 385/28 |
| 4,763,972 | 8/1988 | Papuchon | 385/14 X |
| 4,775,208 | 10/1988 | Robinson et al. | 385/28 |
| 5,078,512 | 1/1992 | Ando | 385/11 |
| 5,185,828 | 2/1993 | van der Tol | 385/28 |
| 5,191,467 | 3/1993 | Kapany et al. | 385/11 |
| 5,198,921 | 3/1993 | Aoshima et al. | 359/248 |
| 5,267,077 | 11/1993 | Blonder | 359/280 |
| 5,285,507 | 2/1994 | Van Der Tol | 385/11 |
| 5,319,493 | 1/1994 | Krasinski et al. | 359/113 |
| 5,321,774 | 6/1994 | Barnard et al. | 385/16 |
| 5,381,250 | 1/1995 | Meadows | 359/39 |

FOREIGN PATENT DOCUMENTS

| | | | |
|---|---|---|---|
| 0522625 | 1/1993 | European Pat. Off. | 385/11 X |

OTHER PUBLICATIONS

Albrecht et al., "Polarization Converter and Splitter for a Coherent Receiver Optical Network on InP", IEEE Colloquium Polarization Effects, Oct. 22, 1990, pp. 9/1–9/3.

*Primary Examiner*—Brian Healy
*Attorney, Agent, or Firm*—Lee, Mann, Smith, McWilliams, Sweeney & Ohlson

[57] ABSTRACT

An integrated optics polarization state converter comprises optically in series a first $TM_0$ to $TM_1$ mode converter that is substantially transparent to $TE_0$, a concatenation of total internal reflectors and a second $TM_0$ to $TM_1$ converter, similarly substantially transparent to $TE_0$, which is connected the way round so as to operate as a $TM_1$ to $TM_0$ converter. Each $TM_0$ to $TM_1$ converter may comprise a tandem arrangement of a 2×2 $TE_0/TM_0$ polarization beam splitting coupler and a mismatched, 3 dB maximum, 2×2 beam splitting coupler. The place of the $TM_0$ to $TM_1$ converters substantially transparent to $TE_0$ may be taken by $TE_0$ to $TE_1$ converters substantially transparent to $TM_0$.

12 Claims, 4 Drawing Sheets

POLARISATION STATE CONVERTER

BACKGROUND TO THE INVENTION

In a variety of optical applications there is a need to convert light of one state of polarisation (SOP) into another. For instance, in a coherent light optical transmission system there is typically a requirement for at least one polarisation state controller to establish a match at the receiver between the state of polarisation of the information carrying signal and that of the local oscillator signal. Polarisation control by means of one or more polarisation state controllers may also form part of a transmission system that has a transmission path that includes optically in a series a number of optical amplifiers, the controllers being employed to take care of polarisation dependent effects liable to be exhibited by such amplifiers.

In optical communications applications the light, whose SOP is to be converted, is typically in zero order mode which, in an integrated optics environment, is resolvable into $TE_0$ and $TM_0$ mode components. In a zero order mode integrated optics environment therefore a polarisation state converter receiving for instance a $TE_0$ mode input signal, delivers from its output a signal having $TE_0$ and $TM_0$ components.

An example of such an integrated optics polarisation state converter is described by P Albrecht et al in a paper entitled, "Integrated Optical Polarisation Splitter", IEE Colloquium Polarisation Effects, Oct. 22, 1990. That converter relies upon a direct conversion between $TE_0$ and $TM_0$ modes using an electrostatic field aligned at right angles to the direction of propagation of light in a waveguide. Conversion is relatively weak in this instance, and proceeds cumulatively only whilst the $TE_0$ and $TM_0$ modes remain in mutual phase coherence. Because phase coherence is difficult to achieve over the necessary lengths, specific and quite elaborate means have had to be provided for compensating phase mismatch on individual devices.

SUMMARY OF THE INVENTION

The present invention is directed to a polarisation state converter that avoids some of the problems associated with direct $TE_0/TM_0$ conversion by making the conversion an indirect one from a zero mode of one polarisation ($TE_0$ or $TM_0$) to a first order mode of the other ($TM_1$ or $TE_1$), followed by a selective conversion of the first order mode of that other polarisation ($TM_1$ or $TE_1$) into a first order mode of the same (other) polarisation ($TM_0$ or $TE_0$).

According to the present invention there is provided an integrated optics polarisation state converter that includes optically in series a zero-to-first order mode converter and a concatenation of total internal reflectors, wherein the zero-to-first order mode converter is either a $TE_0$ to $TE_1$ mode converter that is substantially transparent to $TM_0$ or is a $TM_0$ to $TM_1$ mode converter that is substantially transparent to $TE_0$, and is oriented such that zero order optical power converted by it into first order is launched into the concatenation.

BRIEF DESCRIPTION OF THE DRAWINGS

There follows a description of polarisation state converters embodying the present invention in preferred forms. The description refers to the accompanying drawings in which.

DETAILED DESCRIPTION OF PREFERRED EMBODIMENTS

Figure 1:
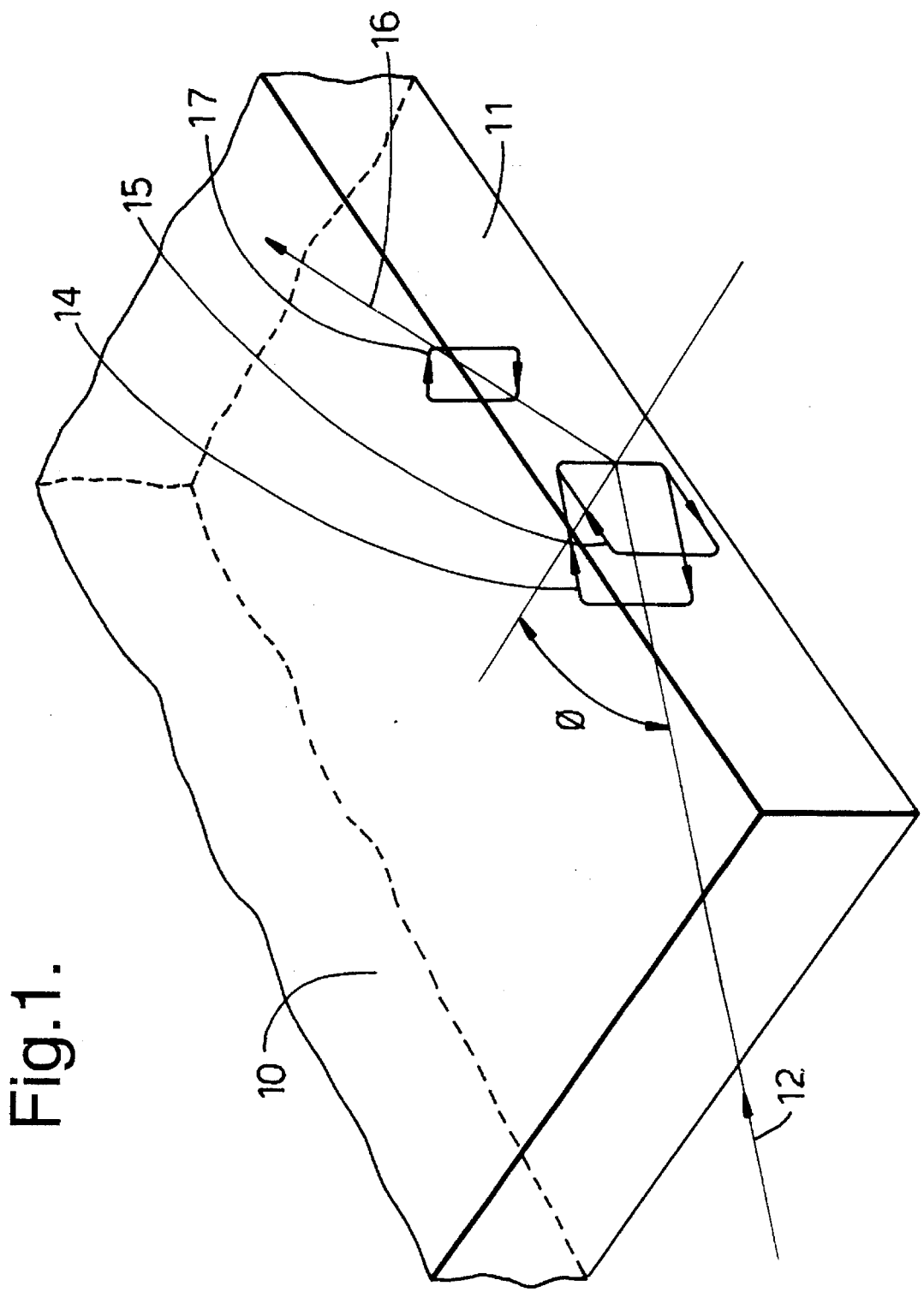
FIG. 1 is a ray diagram of a ray making a total internal reflection in a slab waveguide at a reflecting facet whose normal lies in the plane of the waveguide.

Polarisation state converters embodying the present invention make use of the phenomenon that, when a $TE_0$ mode is obliquely incident upon a surface providing total internal reflection, some of the incident power is converted by the reflection into $TM_1$ power, or of the similar phenomenon that, when a $TM_0$ mode is incident upon that surface, total internal reflection converts some of its power into $TE_1$ power. The way that this conversion arises can be inferred, in the case of $TE_0$ to $TM_1$ conversion, on a phenomenological basis with reference to FIG. 1. This figure depicts a slab waveguide 10 having a reflecting facet 11 the normal to which lies in the plane of the slab waveguide. Incident upon this reflecting facet at an angle of incidence $\phi$, greater than the critical angle, is a ray 12 of $TE_0$ mode light. Since this ray is a $TE_0$ mode ray, its magnetic field component H lies in the plane that contains the ray direction and the slab waveguide normal, its magnetic field component being represented by the loop 14. This magnetic field loop 14 has components lying in the reflecting plane that are given by loop 15. These, in their turn are projected on to the reflected ray 16 as components given by the loop 17. The loop 17 is indicative of a $TM_1$ mode rather than $TM_0$, by virtue of the fact that the transverse magnetic field component at the upper surface of the slab waveguide is oppositely directed to that at its lower surface.

A single reflection will convert only a limited proportion of any incident zero order mode power of one polarisation into first order mode power of the other polarisation, or of incident first order mode power into zero order mode power (i.e. $TE_0$ to $TM_1$, $TM_0$ to $TE_1$, $TE_1$ to $TM_0$, or $TM_1$ to $TE_0$). If a proportion greater than this is required, recourse can be made to more than one reflection. Consider for instance the partial conversion of $TE_0$ power into $TM_1$ power by a single reflection. If this reflection is followed by passage through a mode converter that converts $TM_1$ mode power into $TM_0$ mode power, while remaining substantially transparent to $TE_0$ mode power, then the combination may be considered as effecting a rotation of the polarisation plane through an angle $\theta$, where $\cos \theta$ is equal to the ratio of the reflected and incident $TE_0$ mode intensities at the reflector. If now a second reflector, similar to the first, is located between the first reflector and the $TM_1$ to $TM_0$ converter, then this second reflector can be considered as providing a second rotation to be added to the first. The magnitude of this second rotation lies in the range $-\theta$ and $+\theta$, its particular magnitude depending upon the relative phase existing between the $TE_0$ and $TM_1$ components in the ray reflected by the first reflector at the point where these components are reflected in the second reflector. Generalizing from this it is seen that the maximum possible rotation when using n reflectors is $n\theta$. In particular, if a 22.5° rotation can be achieved with a single reflector, then total conversion of $TE_0$ to $TM_0$ can be achieved using a concatenation of four reflectors whereas, if only 15° rotation is achievable, a concatenation of six reflectors would be required.

The preceding two paragraphs have outlined the process employed for converting $TE_0$ mode power partially or completely into $TM_0$ mode power. This conversion is effected in two stages. The first stage involves the conversion of $TE_0$ mode power partially or completely into $TM_1$ mode power, while the second step involves converting the $TM_1$ mode power into $TM_0$ using a device that is substantially transparent to $TE_0$ mode power. These paragraphs also explain that the particular process employed in the first stage will also convert $TM_0$ mode power into $TE_1$ mode power. Two approaches are possible to the avoidance of this problem. One is to ensure that the power incident upon the polarisation state converter is incident specifically and solely as $TE_0$ mode power. This would for instance be relatively readily achievable if the power is received from a laser diode formed integrally with the polarisation state converter. The other approach is to employ a second $TM_1$ to $TM_0$ mode converter optically upstream of the concatenation, this being oriented to convert any $TM_0$ mode power into $TM_1$ mode power before it reaches the concatenation.

One form of $TM_0$ to $TM_1$ mode converter that is substantially transparent to $TE_0$ will now be described with particular reference to FIG. 2. The mode converter of FIG. 2 comprises a substrate 20, typically of InP, supporting a first higher refractive index waveguide layer 21 typically of quaternary InGaAsP, that is itself covered with a lower refractive index cladding layer 22, typically of InP. These three layers co-operate to form a zero order mode slab waveguide. On top of part of the cladding layer is a second higher refractive index waveguide layer 23, also typically of quaternary InGaAsP, dimensioned to be a zero order slab upper waveguide having $TE_0$ and $TM_0$ propagation constants substantially matching their counterparts of the underlying waveguide layer 21. On top of part of the upper waveguide is a loading strip 24 of material having a refractive index intermediate that of the upper waveguide material and that of the ambient (either air or encapsulant). This loading strip 24, is typically of InP.

Figure 2:
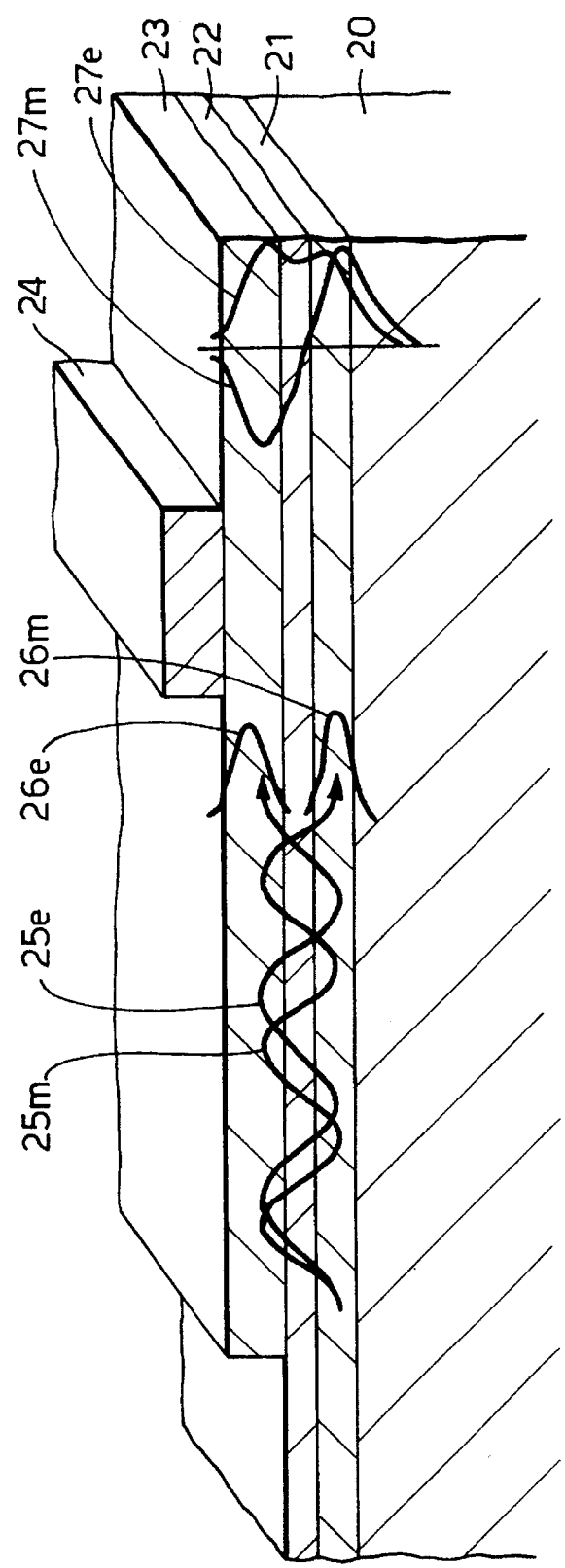
FIG. 2 is a schematic longitudinal section view of a $TM_0$ to $TM_1$ mode converter.

The particular mode converter of FIG. 2 is required to act to convert $TM_1$ to $TM_0$ when operated in one direction, and at the same time to be substantially transparent to $TE_0$. It is a reciprocal device, and hence, when operated in the other direction it will convert $TM_0$ to $TM_1$, and similarly remain substantially transparent to $TE_0$. The explanation as to how it works is conveniently described in terms of operation in the direction which converts $TM_0$ to $TM_1$. At the left hand side of FIG. 2, beyond the left hand end of layer 23, the three layers 20, 21 and 22 co-operate to form a single simple zero-order waveguide. The addition of layer 23 creates a second waveguide, and layer 22 is thin enough for these two waveguides to be mutually coupled. They have matching propagation constants, and so power launched into the lower waveguide will be fully coupled back and forth between the waveguide and the upper waveguide. The propagation constants for the $TE_0$ and $TM_0$ modes are slightly different, and hence the coupling back and forth between the two waveguides, for the $TM_0$ mode as represented by trace 25m, falls out of step with that for the $TE_0$ mode, as-represented by trace 25e. The distance between the left hand end of layer 23 and that of layer 24 is chosen so that, over this distance, the transfers are substantially precisely out-of-step, so that $TE_0$ power launched into the left hand end of layer 21 resides under the left hand end of loading strip 24 substantially exclusively in the upper waveguide, as represented by intensity distribution trace 26e; while similarly launched $TM_0$ power resides substantially exclusively in the lower waveguide, as presented by intensity distribution trace 26m. Over this distance therefore the two coupled waveguides are seen to act as a kind of 2×2 polarisation beam splitting coupler.

The function of the loading strip 24 is to increase the propagation constants of the upper waveguide, so that in this region they no longer substantially match those of the lower waveguide. The two waveguides still remain coupled, but no longer is there substantially total power transfer from either guide to the other. In fact the thickness of the loading strip in relation to its refractive index is chosen to produce the requisite mismatch to provide 3 dB maximum power transfer. This length is chosen to terminate the mismatch at the first 3 dB maximum power transfer point. In the case of a matched propagation constant 3 dB coupled waveguide 2×2 coupler, light launched into either input port emerges from the two output ports in phase quadrature relationship. In this type of mismatched propagation constant 3 dB coupled wavelength coupler, light launched into the input port of the waveguide with the lesser propagation constants emerges from the two output parts in antiphase with each other, as represented by the amplitude distribution trace 27m, while that launched into the input port of the waveguide with the greater propagation constants emerges from the two output ports in phase with each other, as represented by the amplitude distribution trace 27e. These two amplitude traces 27m and 27e respectively correspond reasonably closely with those of first order and zero order modes, and hence it is seen that the device of FIG. 2 acts as a $TM_0$ to $TM_1$ mode converter that is substantially transparent to $TE_0$.

Figure 3:
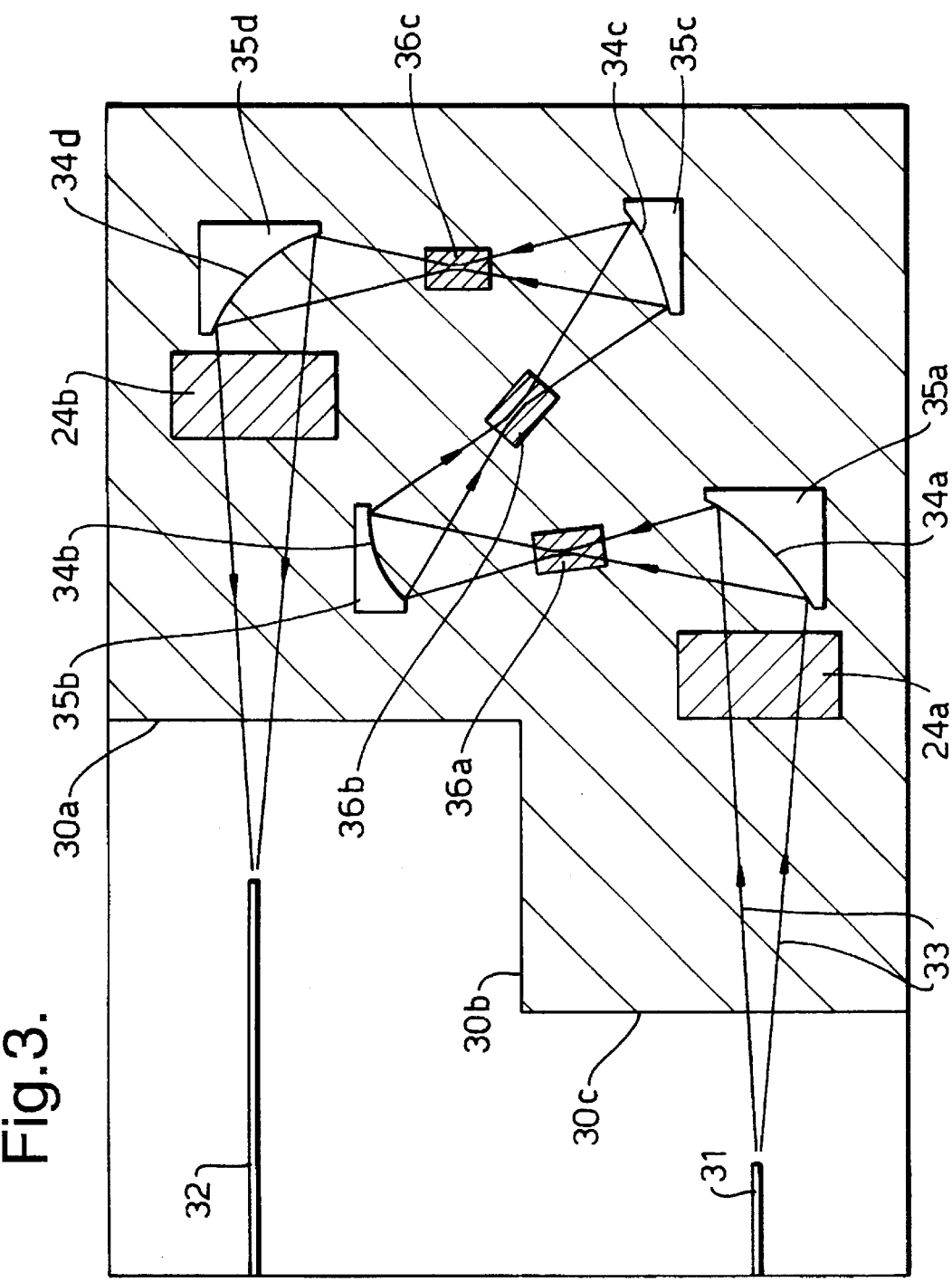
FIG. 3 is a schematic plan view of a polarisation state converter incorporating a pair of FIG. 2 type $TM_0$ to $TM_1$ mode converters.

Turning attention now to FIG. 3, here is depicted a schematic plan view of a polarisation state converter incorporating a pair of $TM_0$ to $TM_1$ converters as described above with reference to FIG. 2. The polarisation state converter has the same layer structure as that of the two mode converters that are incorporated within it. To the left of a boundary line formed in three sections 30a, 30b and 30c there is no second (upper) waveguide layer 23, and hence here the first (lower) waveguide layer 21 is covered solely by the cladding layer 22. However, within this region are formed two 2-dimensional waveguides 31 and 32 possessing a structure providing a lateral waveguiding effect within the plane of the lower slab waveguide. Light launched into the polarisation state converter by way of waveguide 31 begins to fan out in the plane of the lower waveguide layer 21 after emerging from the inner end of that 2-dimensional waveguide. This fanning out is represented by rays 33. After the light passes under section 30c of the boundary of the second waveguide layer 33, it travels a certain distance before passing under a first loading strip 24a, and proceeds from there on to a first total internal reflector 34a. After being reflected in reflector 34a, the light makes a further reflection in each of three further total internal reflectors 34b, 34c and 34d before passing under a second loading strip 24b, proceeding back out from under the boundary of the second waveguide layer in section 30a, and from there into the inner end of 2-dimensional waveguide 32. The distance from section 30c of the boundary line delineating the end of the second waveguide layer and the further edge of the loading strip 24a constitutes the first of the $TM_0$ to $TM_1$ mode converters of the structure, and the equivalent distance from section 30a to the further edge of loading strip 24b constitutes the second. The four reflectors 34a, 34b, 34c and 34d are provided by the arcuate vertical side-walls of four etched wells 35a, 35b, 35c and 35d etched through both waveguide layers 21 and 23, and into or through substrate 20.

Any $TE_0$ mode power present in the light launched into the polarisation state converter by way of 2-dimensional waveguide 31 passes substantially unattenuated through the first $TM_0$ to $TM_1$ converter to be incident upon the first reflector 34a. Similarly any $TM_0$ power is converted to a mixture of $TE_0$ and $TM_1$ mode power before it is incident upon the reflector. This reflector 34a redistributes the power between the $TE_0$ and $TM_1$ modes, and directs it as a convergent beam towards the next reflector, reflector 34b. It arrives at reflector 34b as a divergent beam, and this reflector similarly redistributes the power between the two modes and directs it towards the third reflector, reflector 34c. Each of the third and fourth reflectors performs a similar function in its turn. Any $TM_1$ mode power in the light leaving reflector 34d is converted to $TM_0$ power in its passage through the second $TM_0$ to $TM_1$ mode converter, and this is then launched together with the TE mode power, if any, into the inner end of 2-dimensional waveguide 32.

As mentioned previously, if the input to the polarisation state converter is never going to contain any $TM_0$ mode power, then the mode converter optically upstream of the concatenation of four reflects 34a to 34d is unnecessary and can safely be dispensed with.

It has been explained above that if the mode conversions effected by the individual reflectors are to be considered as rotations, then such rotations will sum algebraically only if the phase relationship between the $TE_0$ and $TM_1$ modes are correct at each incidence. Since the two modes have different propagation constants, the phase relationship changes along the optical path. Accordingly, for an entirely passive polarisation state converter, it is possible to design the structure with specific reflector separations designed automatically to provide the requisite phase relationships. An alternative approach is to include active element 36a, 36b and 36c between each pair of reflectors by means of which the birefringence of the optical path can be electrically adjusted. Such adjustment can be exercised for instance by use of the Stark effect.

The polarisation state converter of FIG. 3 exemplifies an arrangement using four reflectors, but it should be clearly understood that the specific choices of four reflectors is by way of example only. Other possible modifications include the use of a different form of $TM_0$ to $TM_1$ mode converter to that specifically described with reference to FIG. 2 which comprises a tandem arrangement of a $TE_0/TM_0$ polarisation 2×2 beam splitting coupler and a mismatched, 3 dB maximum, 2×2 beam splitting coupler. A specific example of such an alternative form of $TM_0$ to $TM_1$ mode converter will now be described with specific reference to FIG. 4.

Figure 4:
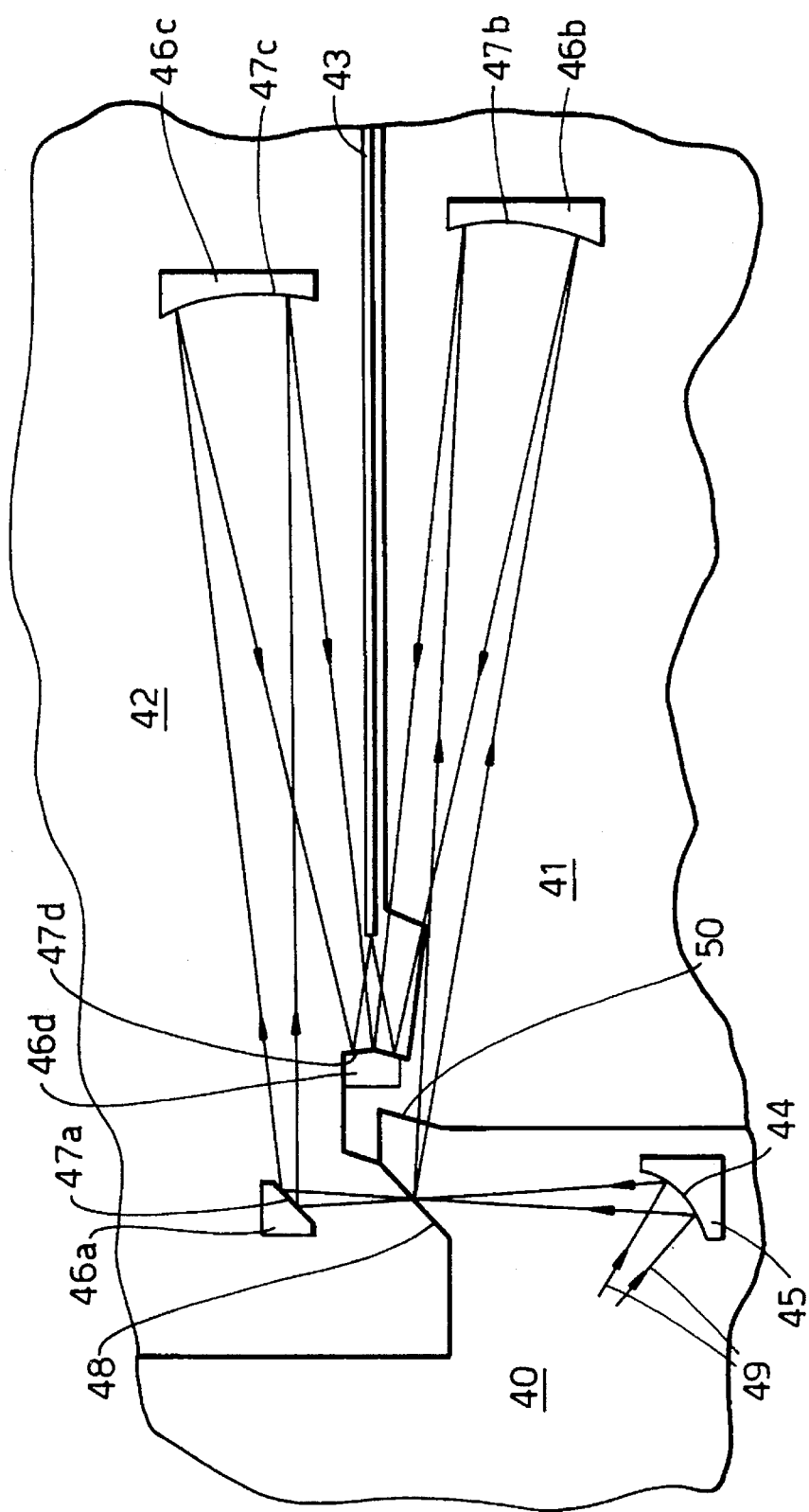
FIG. 4 is a schematic plan view of an alternative form of $TM_0$ to $TM_1$ mode converter which may be used in the FIG. 3 polarisation state converter in place of its FIG. 2 type $TM_0$ to $TM_1$ mode converters.

The layer structure of the $TM_0$ to $TM_1$ mode converter of FIG. 4 has three distinct regions 40, 41 and 42. In region 40 there is a full layer structure comprising substrate 20 first waveguide layer 21, cladding layer 22, and second waveguide layer 23, which itself is covered by a second cladding layer, also of lower refractive index, and typically of InP. In region 41 the second waveguide and second cladding layers are missing, and in region 42 the lower cladding layer is also missing. A final reflector of the set of reflectors providing $TE_0$ to $TM_1$ conversion, and corresponding for instance either to reflector 34e or 34d of FIG. 3, is represented at 44. Similarly an input or output 2-dimensional waveguide, which has the same layer structure as region 41, and corresponding for instance either to 2-D waveguide 31 or 2-D waveguide 32 of FIG. 3, is represented at 43. Reflector 44 is provided by a vertical side-wall of an etched well 45. Similar etched wells 46a, 46b, 46c and 46d provide four further reflectors 47a, 47b, 47c and 47d. An additional reflector is provided at a portion 48 of the boundary between regions 40 and 42, but in this instance the reflecting facet does not intersect the first (lower) waveguide layer, and so it is only power propagating in the second upper waveguide layer that is reflected by it.

Light propagating in the direction indicated by rays 49, and reflected by reflector 44, is split by reflector 48 into two parts. The part, that at that point is guided by the first (lower) waveguide layer 21, is undeviated by the reflector 48 and therefore propagates on to be incident upon reflector 46a. The part, that at that point is guided by the second (upper) waveguide layer 23, is deviated through approximately 90° by reflector 48. The distance between this reflector 48 and the portion 50 of the boundary between regions 40 and 41 towards which the light has been deviated is chosen so that, over this distance, the deviated light is coupled substantially completely into being guided by the first lower waveguide layer 21.

The two parts, split by the action of reflector 48, are then re-united at the inner end of the 2-dimensional waveguide 43 after the one has been respectively reflected in reflectors 47b and 47d, while the other has been reflected in reflectors 47a, 47c and 47d. Any $TE_0$ mode power present in the light reflected by reflector 44 is shared between the two parts, as also is any $TM_1$ mode power. The TE components of the two parts, being components derived from a $TE_0$ mode, start off in phase with each other, and therefore the optical path difference for TE mode light travelling the two paths should be zero or an integral number of wavelengths. Had the waveguides been of identical construction over the two paths, this would have meant that optical path difference for TM mode light would similarly have been zero or an integral number of wavelengths. With such an optical path difference, the TM components of the two parts, being components derived from a $TM_1$ mode, start off in anti-phase relationship, and therefore would similarly be recombined in antiphase relationship at the inner end of the 2-dimensional waveguide 43. The difference between the construction of the two waveguides introduced by the fact that one pathway is formed exclusively in region 42, whereas a large proportion of the other is formed in region 41, provides a differential birefringence between the two pathways. The specific proportion is selected so that, while the optical path difference for TE mode power is zero or an integral number of wavelengths, that for TM mode power is a half integral number of wavelengths. This ensures that the TE components are launched into the inner end of the 2-dimensional waveguide 43 as $TE_0$ mode power while the TM components are similarly launched as $TM_0$ mode power.

The optical path differences specified in the preceding paragraph are those required for the device of FIG. 4 to operate as a $TM_1$ to $TM_0$ mode converter substantially transparent to $TE_0$. From these considerations it will be apparent that the structure may be modified so as to interchange the optical path difference relationships, providing zero or an integral number of wavelengths of optical path difference is provided for TM mode power, and a half integral number for TE mode power. Thereby a structure is provided which operates as a $TE_1$ to $TE_0$ mode converter substantially transparent to $TM_0$.

I claim:

1. An integrated optics polarisation state converter that includes optically in series a zero-to-first order mode converter and a concatenation of total internal reflectors, wherein the zero-to-first order mode converter is selected from the group comprising a $TE_0$ to $TE_1$ mode converter that is substantially transparent to $TM_0$ and a $TM_0$ to $TM_1$ mode converter that is substantially transparent to $TE_0$, which mode converter is oriented such that zero order optical power converted by it into first order is launched into the concatenation.

2. An integrated optics state converter as claimed in claim 1, wherein the series combination of the zero-to-first order mode converter and the concatenation of total internal reflectors is optically in series with a second zero-to-first order mode converter such that the concatenation lies optically between the two zero-to-first order mode converters, and wherein both of said zero-to-first order mode converters are selected from the same element of the group comprising a $TE_0$ to $TE_1$ mode converter that is substantially transparent to $TM_0$ and a $TM_0$ to $TM_1$ mode converter that is substantially transparent to $TE_0$, and each of which mode converters is oriented such that zero order optical power converted by it into first order is launched into the concatenation.

3. An integrated optics polarisation state converter as claimed in claim 1, wherein an electrically controllable variable birefringence element is included in the optical path between each pair of optically consecutive total internal reflectors of the concatenation.

4. An integrated optics polarisation state converter as claimed in claim 2, wherein an electrically controllable variable birefringence element is included in the optical path between each pair of optically consecutive total internal reflectors of the concatenation.

5. An integrated optic polarisation state converter as claimed in claim 1, wherein the zero-to-first order mode converter comprises a tandem arrangement of a $TE_0/TM_0$ polarisation beam splitter and a mismatched, 3 dB maximum, beam splitting coupler.

6. An integrated optic polarisation state converter as claimed in claim 2, wherein each of the zero-to-first order mode converters comprises a tandem arrangement of a $TE_0/TM_0$ polarisation beam splitter and a mismatched, 3 dB maximum, beam splitting coupler.

7. An integrated optic polarisation state converter as claimed in claim 3, wherein the zero-to-first order mode converter comprises a tandem arrangement of a $TE_0/TM_0$ polarisation beam splitter and a mismatched, 3 dB maximum, beam splitting coupler.

8. An integrated optic polarisation state converter as claimed in claim 4, wherein each of the zero-to-first order mode converters comprises a tandem arrangement of a $TE_0/TM_0$ polarisation beam splitter and a mismatched, 3 dB maximum, beam splitting coupler.

9. A coherent light optical transmission system incorporating at least one integrated optics polarisation state converter as claimed in claim 1.

10. A coherent light optical transmission system incorporating at least one integrated optics polarisation state converter as claimed in claim 2.

11. An optical transmission system having an optical transmission path that includes a plurality of optical amplifiers optically in series, which system incorporates at least one integrated optics polarisation state converter as claimed in claim 1.

12. An optical transmission system having an optical transmission path that includes a plurality of optical amplifiers optically in series, which system incorporates at least one integrated optics polarisation state converter as claimed in claim 2.

* * * * *